(12) United States Patent
Altmann et al.

(10) Patent No.: US 7,927,571 B2
(45) Date of Patent: Apr. 19, 2011

(54) METHOD AND DEVICE FOR PRODUCING HIGH PURITY POLYCRYSTALLINE SILICON WITH A REDUCED DOPANT CONTENT

(75) Inventors: Thomas Altmann, Haiming (DE); Hans Peter Sendlinger, Burgkirchen (DE); Ivo Croessmann, Hamburg (DE)

(73) Assignee: Wacker Chemie AG, Munich (DE)

( * ) Notice: Subject to any disclaimer, the term of this patent is extended or adjusted under 35 U.S.C. 154(b) by 700 days.

(21) Appl. No.: 11/834,135

(22) Filed: Aug. 6, 2007

(65) Prior Publication Data

US 2008/0038178 A1 Feb. 14, 2008

(30) Foreign Application Priority Data

Aug. 8, 2006 (DE) .................. 10 2006 037 020

(51) Int. Cl.
*C01B 33/035* (2006.01)
*H01L 21/322* (2006.01)
*C30B 25/00* (2006.01)
*C30B 35/00* (2006.01)

(52) U.S. Cl. ............ 423/348; 423/349; 423/350; 117/2; 117/89

(58) Field of Classification Search .......... 423/348–350; 117/85, 89, 109, 2
See application file for complete search history.

(56) References Cited

U.S. PATENT DOCUMENTS

| 2,944,874 | A | 7/1960 | Irvine et al. | |
|---|---|---|---|---|
| 4,179,530 | A | 12/1979 | Koppl et al. | |
| 4,715,317 | A | 12/1987 | Ishizuka et al. | |
| 5,976,481 | A | * 11/1999 | Kubota et al. | 423/348 |
| 6,281,098 | B1 | * 8/2001 | Wang et al. | 438/488 |
| 6,749,824 | B2 | * 6/2004 | Keck et al. | 423/348 |

FOREIGN PATENT DOCUMENTS

| DE | 1 532 649 | 11/1978 |
|---|---|---|
| GB | 878766 | 2/1958 |
| JP | 63-225513 | 9/1988 |
| WO | 98/40543 | 9/1998 |

OTHER PUBLICATIONS

Patent Abstract corres. to JP 63-225513, published Sep. 1988.

\* cited by examiner

*Primary Examiner* — Timothy C Vanoy
*Assistant Examiner* — Diana J Liao
(74) *Attorney, Agent, or Firm* — Brooks Kushman P.C.

(57) ABSTRACT

In the batch production of high purity polycrystalline silicon, in which a U-shaped silicon carrier body is fastened in an open deposition reactor, the deposition reactor is hermetically sealed, the U-shaped carrier body is heated electrical current, a silicon-containing reaction gas and hydrogen are introduced into the reactor through a supply line so that silicon from the reaction gas is deposited on the carrier body, the diameter of the carrier body increases and a waste gas formed is removed from the deposition reactor through a discharge line, and, after a desired diameter of the polysilicon rod is reached, deposition is terminated, the carrier body is cooled to room temperature, the reactor is opened, the carrier body is removed from the reactor and a second U-shaped silicon carrier body made of silicon is fastened in the deposition reactor, an inert gas is fed through the supply and discharge lines into the open reactor from at least the time when the reactor is opened to extract the first carrier body with deposited silicon, until at least the time when the reactor is closed in order to deposit silicon on the second carrier body.

8 Claims, 6 Drawing Sheets

METHOD AND DEVICE FOR PRODUCING HIGH PURITY POLYCRYSTALLINE SILICON WITH A REDUCED DOPANT CONTENT

BACKGROUND OF THE INVENTION

1. Field of the Invention

The invention relates to a method and a device for the production of high purity polycrystalline silicon with a reduced dopant content, as well as to the silicon thus produced.

2. Description of the Related Art

High purity polycrystalline silicon (polysilicon) is used as a starting material for the production of monocrystalline silicon for semiconductors according to the Czochralski (CZ) method or the floating zone (FZ) method and for the production of solar cells for photovoltaic applications. It is generally batch-produced using the Siemens process. In this case a reaction gas containing silicon is thermally decomposed or reduced by hydrogen and highly pure silicon is deposited on thin filament rods of silicon, so-called thin rods. The silicon-containing component of the reaction gas may be a halosilane with the general composition $SiH_nX_{4-n}$ (n=0, 1, 2, 3; X=Cl, Br, I). It preferably comprises chlorosilanes (X=Cl), most particularly preferably trichlorosilane (n=1).

The method is carried out in a deposition reactor. In its most common embodiment, the deposition reactor comprises a metal base plate and a coolable bell jar, which is placed onto the base plate so that a reaction space is formed inside the bell jar. The deposition reactor must be hermetically sealed, since the reaction gases have a corrosive effect and are liable to self-ignite or explode when mixed with air. The base plate is provided with one or more supply openings and one or more discharge openings for the reaction gases, as well as with holders which are used to hold the thin rods in the reaction space. Two neighboring rods are generally connected by a bridge at their free ends, on the opposite side from the held base ends, to form a U-shaped carrier body. The U-shaped carrier bodies are heated to the deposition temperature by direct flow of current, and the reaction gas is supplied.

FIG. 1 shows a device according to the prior art for the deposition of polysilicon. In order to deposit polysilicon, the stop valve (8) for the reaction gas (1) flowing to the reactor (4), i.e. a mixture of hydrogen and one of the known silicon-containing components, as well as the stop valve (7) for the waste gas (7) flowing out of the reactor (4) are opened. The reaction gas (1) flows through the supply opening (2) of the base plate (3) into the closed deposition reactor (4). There, silicon is deposited onto the thin rods (not shown) heated by direct flow of current. The hot waste gas thereby formed in the reactor (4) leaves the reactor through the exhaust opening (5) in the base plate (3), and can subsequently be subjected to reprocessing, for example condensation, or supplied to a gas-scrubber.

During the deposition of silicon, the halogenated silicon compounds, for example trichlorosilane, decompose from the gas phase on the surface of the heated thin rods. The diameter of the thin rods thereby grows. After a desired diameter is reached, the deposition is terminated and the polysilicon rods thereby obtained are cooled to room temperature.

After the rods have been cooled, the bell jar is opened and the rods are removed for further processing with the assistance of extraction aids. The bell jar and base plate of the reactor are subsequently cleaned, and provided with new electrodes and thin rods for the next deposition batch. After the bell jar has been sealed, the method is carried out again as described above in order to deposit the next batch of polysilicon.

From the time at which the reactor is opened in order to extract the deposited batch of polysilicon until the reactor is reclosed in order to deposit the subsequent batch of polysilicon, the base plate and the supply and exhaust openings for the reaction gases and the waste gases are exposed to environmental effects, in particular humidity. If moisture enters, particularly into the supply and discharge lines of the reactors, then halosilane residues, for example unreacted reaction gas, or halosilanes or polysilanes formed by the process lead to the formation of corrosive hydrogen halides such as hydrogen chloride.

The hydrogen halide corrodes reactor components, particularly the supply and discharge lines of the reactor. Substances detrimental to the process, for example the electrically active dopants boron, aluminum, phosphorus, arsenic and antimony, are thereby leached from the components of the reactor. During the subsequent deposition, particularly at the start of deposition, an elevated level of these substances will be introduced into the silicon being deposited. This introduction of dopants undesirably modifies the characteristic properties of polysilicon. For example the electrical resistivity, which is crucially determined in silicon by the level of electrically active dopants, is reduced at the start of deposition, which also leads to an inferior radial profile of the electrical resistivity in the deposited poly rod.

In the case of polysilicon produced on a thin rod by deposition, as described, the electrical resistivity on the surface of the thin rod is therefore lowest immediately after the start of deposition. From there, it increases continuously in the direction toward the rod edge until it reaches a plateau. As schematically represented in FIG. 2, this is caused by a phosphorus content decreasing from the thin rod (15) in the direction toward the edge of the polysilicon rod (16) together with a virtually constant boron content. This effect becomes commensurately more detrimental the later this resistance plateau is reached in the course of the deposition. The average electrical resistivity of such a polysilicon rod turns out to be lower, over the entire deposited diameter, than for polysilicon rods with the same final diameter in which this plateau in the radial resistance profile was reached faster. This is particularly problematic when monocrystalline silicon is intended to be produced from the polycrystalline silicon according to the floating zone (FZ) method, which requires a starting material with particularly low dopant values, i.e. an electrical resistivity which is as high as possible.

In order to quantitatively determine and assess the quality of the radial resistance profile, it is highly suitable to use the gradient of the straight line starting from the minimum resistance $\rho_0$ of the polysilicon deposited on the surface of the thin rod immediately after the start of deposition, at the position $r=r(\rho_0)=0$ (definition: r=0 is the start of the poly rod), until the resistance plateau $\rho\infty$ is reached at $r=r(\rho_\infty)$:

$$m_\rho = \Delta\rho/\Delta r = \frac{\rho_\infty - \rho_0}{r(\rho_\infty) - r(\rho_0)}$$

The greater the numerical value of $m_\rho$ is, the faster the plateau in the radial resistance profile will be reached and therefore the higher the average electrical resistivity of the polycrystalline silicon rod will be over the entire deposited diameter.

Here:

$M_\rho$=gradient of the electrical resistivity profile until the plateau is reached [Ωcm/mm]

$\rho_\infty$=electrical resistivity at the start of the plateau [Ωcm]

$\rho_0$=minimum electrical resistivity of the polysilicon deposited on the surface of the thin rod, immediately after the start of deposition [Ωcm], $r(\rho_\infty)$=radius of the polysilicon rod at the start of the plateau [mm]

$r(\rho_0)$=radius of the polysilicon rod on the surface of the thin rod immediately after the start of deposition [mm], which is defined as r=0.

Polysilicon rods produced according to the prior art with a high electrical resistivity for use as FZ polysilicon have values of between 45 and 70 Ωcm/mm for the gradient of the radial resistance profile.

In order to determine the resistance and the level of dopants, samples are usually taken from the polycrystalline silicon according to the standard SEMI MF 1723-1104 (23.10.2003) and are prepared by float zone (FZ) pulling. The resistance is determined according to standard SEMI MF 397-02 (22.10.2003) and the dopants are determined according to standard SEMI MF 1389-0704 (22.10.2003). Said standards are published by: Semiconductor Equipment and Materials International (SEMI®), San Jose, Calif. (USA).

In a method for depositing polycrystalline silicon on a graphite surface, it is known from GB 1532649 to flush the closed reactor with an inert gas, for example argon, before the start of heating the deposition surface or briefly before the deposition. This inert gas flushing to flush out a closed reactor while the process is taking place is carried out for inerting or to avoid explosive gas mixtures (oxygen removal).

SUMMARY OF THE INVENTION

It is an object of the present invention to provide a method for the batch production of high purity polycrystalline silicon having a dopant concentration which is as low as possible and an average electrical resistivity which is as high as possible, which avoids the disadvantages of the prior art. These and other objects are achieved by a method in which a U-shaped carrier body made of silicon is fastened in an open deposition reactor, the deposition reactor is hermetically sealed, the U-shaped carrier body is heated by direct flow of current, a silicon-containing reaction gas and hydrogen are introduced into the deposition reactor through a supply line so that silicon from the reaction gas is deposited on the carrier body, the diameter of the carrier body increases and a waste gas is formed which is removed from the deposition reactor through a exhaust line, and, after a desired diameter of the carrier body is reached, the deposition is terminated, the carrier body is cooled to room temperature, the deposition reactor is opened, the carrier body is removed from the deposition reactor and a second U-shaped carrier body made of silicon is fastened in the deposition reactor, wherein an inert gas is fed through the supply line and the exhaust line into the open reactor from the time when the deposition reactor is opened in order to extract the first carrier body with deposited silicon until the time when the reactor is closed in order to deposit silicon on the second carrier body.

DETAILED DESCRIPTION OF THE PREFERRED EMBODIMENTS

The U-shaped carrier body, which is installed in the reactor, may consist of monocrystalline, multicrystalline or polycrystalline silicon. The inert gas is preferably supplied through the supply line and the discharge line and then through the supply and discharge openings of the base plate, in which case a heat exchanger or a saturator may also be installed in the lines. Furthermore, the inert gas is preferably supplied into the deposition reactor's bell jar which is raised in order to extract the polysilicon rod. The inert gas is in this case preferably supplied through an upwardly directed nozzle swiveled into place. Nitrogen or a noble gas, such as argon or helium, is for example used as the inert gas. Nitrogen or argon are preferably used, most preferably nitrogen.

The method according to the invention protects the base plate as well as the supply and discharge lines of the deposition reactor against the ingress of environmental effects, in particular humidity, and removes halosilane residues, in particular trichlorosilane residues or polysilane residues from the supply and discharge lines. The formation of hydrogen halide, in particular hydrogen chloride, is therefore avoided and concomitant leaching of dopants, in particular phosphorus, from the material of the supply and discharge lines is avoided.

The method of the invention also leads to a reduced variation of the dopant level, in particular of phosphorus, from batch to batch, and makes it possible to produce a polycrystalline silicon rod which has a high electrical resistivity on the surface of the thin rod immediately after the start of deposition, compared with known polycrystalline silicon rods. This leads to a polycrystalline silicon rod which has a larger gradient of the radial profile of the electrical resistivity. The invention therefore also relates to a polycrystalline silicon rod, which has a gradient $m_\rho$ of the radial profile of the electrical resistivity of at least 75 Ωcm/mm, preferably between 80 Ωcm/mm and 200 Ωcm/mm. Such polycrystalline silicon rods are most preferably produced by deposition from trichlorosilane.

The high electrical resistivity of the polycrystalline silicon rod is due to reduced dopant ingress, in particular of phosphorus, into the polysilicon at the start of the deposition process. The polycrystalline silicon crystal according to the invention is preferably suitable for the production of monocrystalline silicon, more preferably for the production of monocrystalline silicon according to the FZ method.

Figure 1:
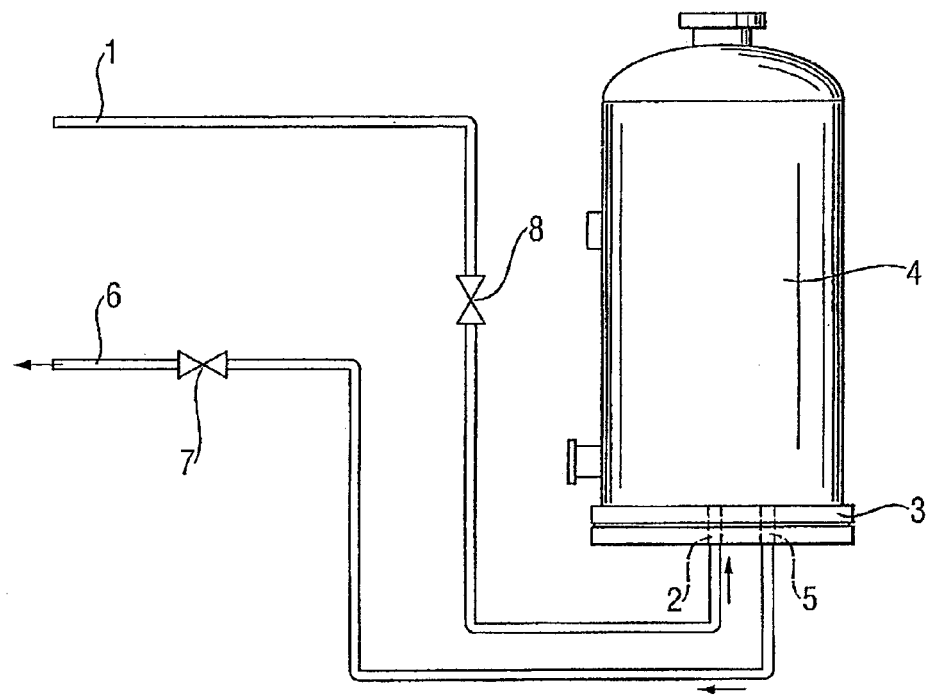
FIG. 1 shows a device according to the prior art for the deposition of polysilicon.
Figure 2:
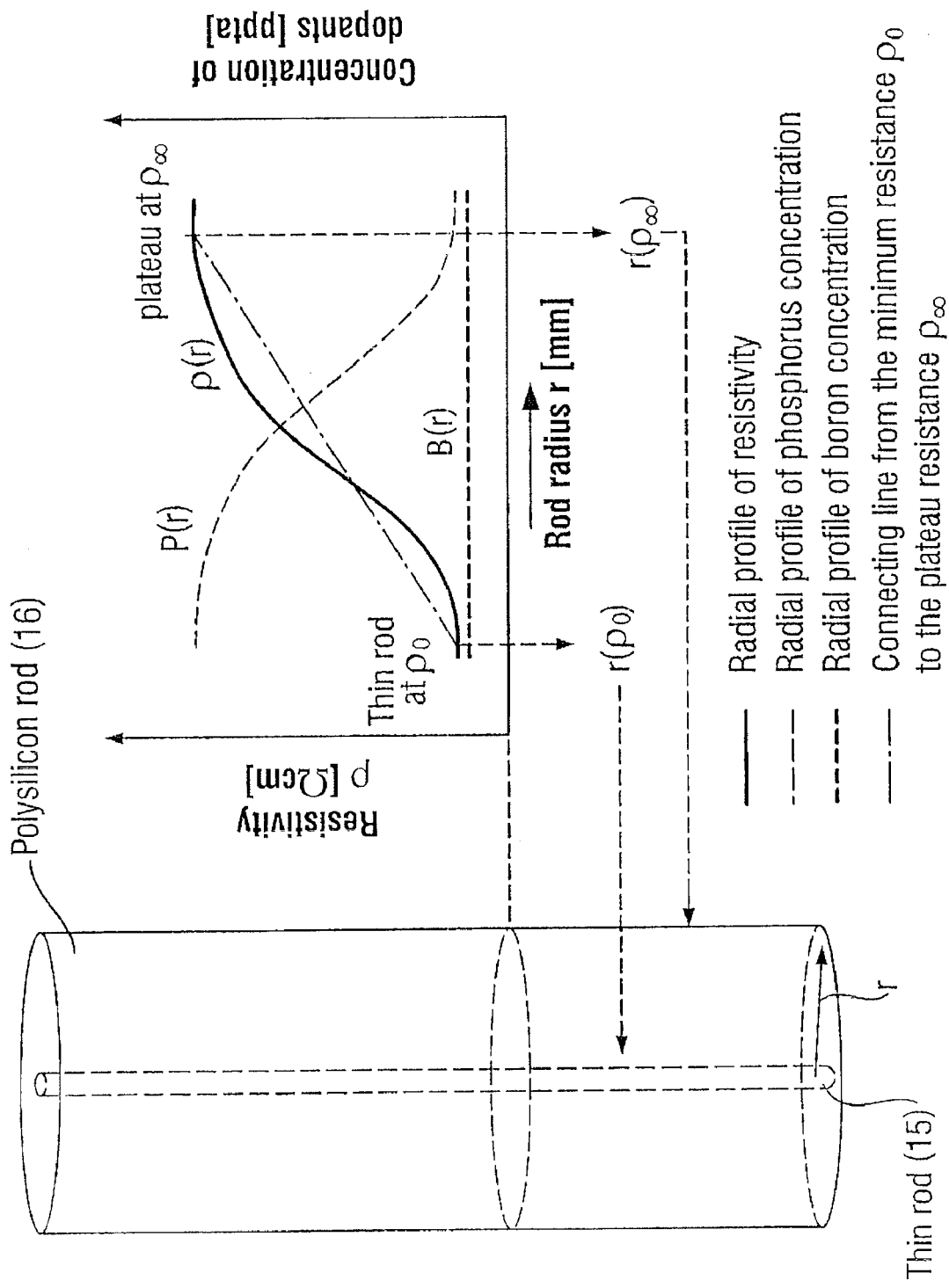
FIG. 2 illustrates the relationships between resistivity, dopant concentration, and rod radius for a Siemens process rod.
Figure 3:
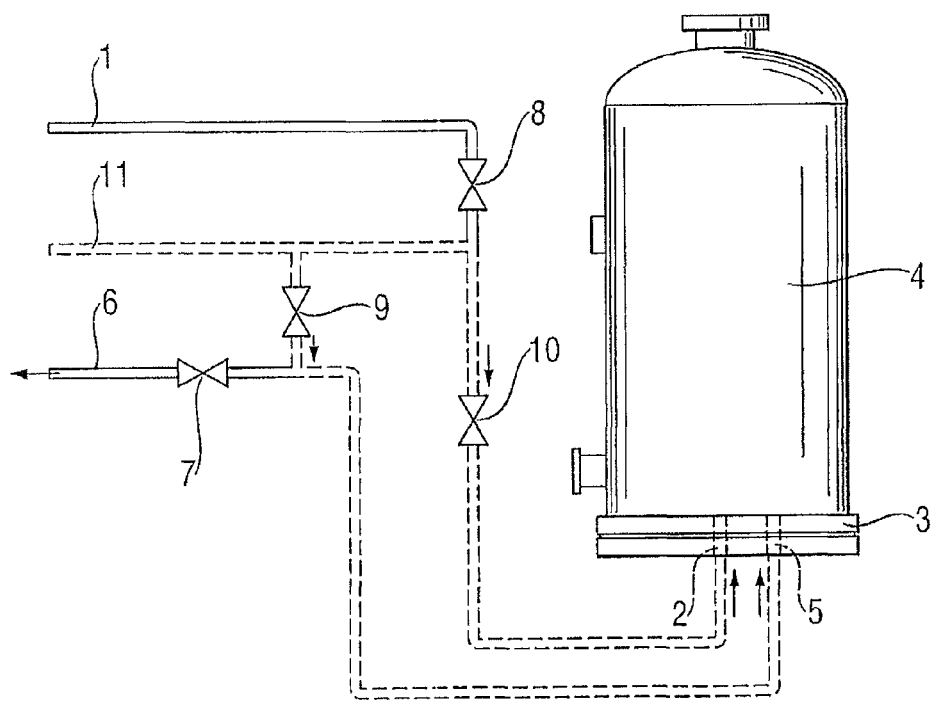
FIG. 3 illustrates one embodiment of the subject invention process and apparatus.

The invention furthermore relates to a device for carrying out the method according to the invention. Such a device is represented in FIG. 3. This device comprises a supply line for a reaction gas (1) with a stop valve (8), which leads via a supply opening (2) through the base plate (3) into a reactor (4), as well as a discharge line for a waste gas (6), which leads through a discharge opening (5) in the base plate (3) of the reactor (4) via a stop valve (7) into the atmosphere or to a reprocessing unit, wherein an inert gas line (11), which can be regulated by a stop valve (10), opens into the supply line (1) after the stop valve (8) and an inert gas line (11), which can be regulated by a stop valve (9), opens into the discharge line (6) before the stop valve (7).

In order to carry out the method according to the invention by means of this device, the stop valves (7) and (8) for the waste gas (6) and the reaction gas (1) are closed before the deposition reactor is opened in order to remove the deposited rods of polycrystalline silicon which have been cooled to room temperature. The two delivery valves (9) and (10) for the inert gas are subsequently opened. The inert gas then flows simultaneously through the lines for the waste gas (6) and the reaction gas (1) through the supply opening (2) and the discharge opening (5) through the base plate (3) into the reactor (4). The inert gas flow rate to avoid backward diffusion in the supply line is preferably at least 0.5 m$^3$/h, more preferably from 1 m$^3$/h to 10 m$^3$/h, depending on the line cross section being used. Correspondingly, the amount of inert gas in the discharge line is for the same reasons preferably at least 1 m$^3$/h, more preferably from 3 m$^3$/h to 10 m$^3$/h.

Figure 4:
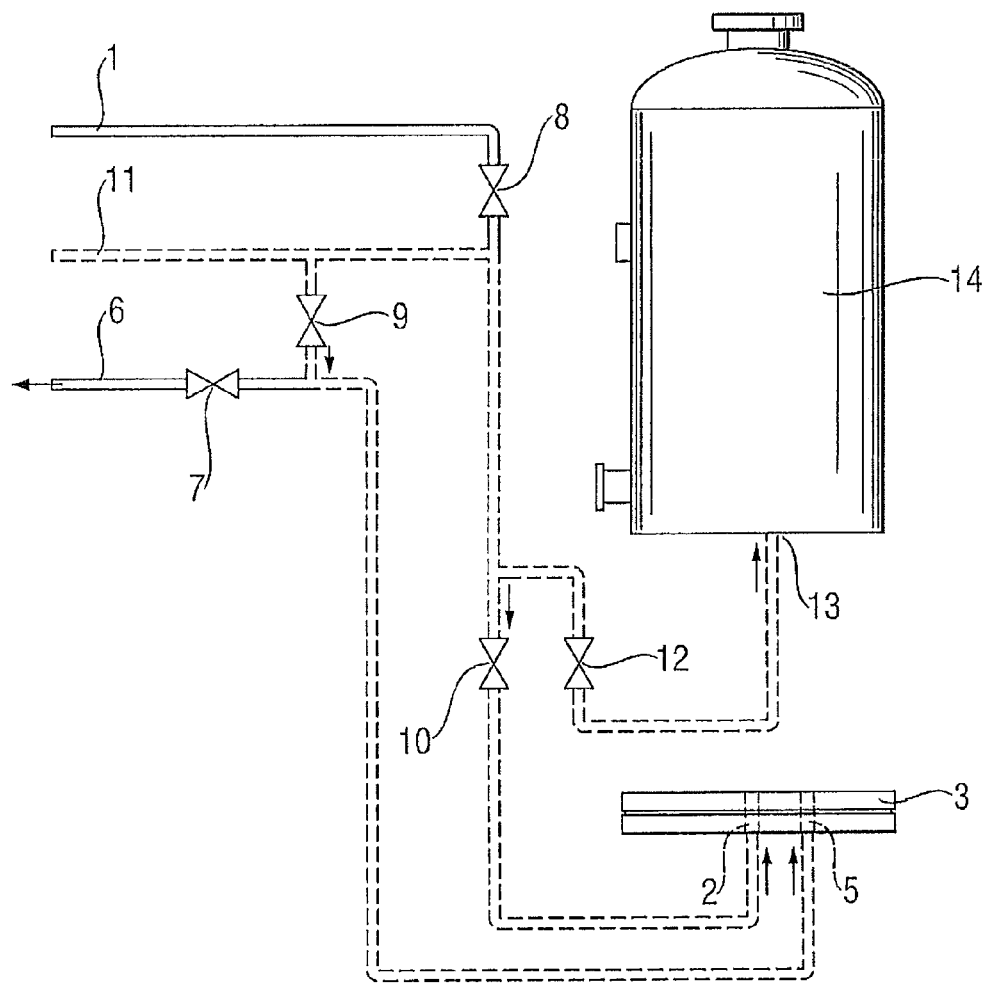
FIG. 4 illustrates a second embodiment of the subject invention process and apparatus.

The device according to the invention preferably furthermore comprises an inert gas outlet (13) directed vertically upward for the inert gas (12), consisting of one or more nozzles ("showerhead principle"), which can be regulated by means of a stop valve (12). The flow rate of the inert gas is in this case preferably at least 0.5 m$^3$/h, more preferably from 3 m$^3$/h to 10 m$^3$/h. FIG. 4 shows such a device according to the invention.

When carrying out the method according to the invention by using a device according to FIG. 3, immediately after opening the deposition reactor and raising the bell jar (14) in order to remove the rods of polycrystalline silicon (not shown), the device with an inert gas outlet (13) directed vertically upward is brought directly under the raised bell jar (14), for example by swiveling it into place or statically suspending it in the bell jar. An inert gas valve (12) is subsequently opened. The inert gas then flows upward through the raised bell jar (14). In order to avoid backward diffusion, the flow rate of inert gas through the spray mechanism (13) is preferably at least 0.5 m$^3$/h, more preferably from 3 m$^3$/h to 10 m$^3$/h, depending on the line cross section being used.

This method is continued without interruption until the deposited polycrystalline silicon has been fully removed from the deposition reactor, and thin rods and electrodes for the next deposition have been installed. Immediately before closing the reactor for the start of the next deposition, the device (13) for inert gas flushing of the bell jar (14) is removed, for example by unsuspending it or swiveling it away, and the inert gas valve (12) is closed. After the reactor has been closed by lowering the bell jar, the inert gas valves (9) and (10) are closed. The stop valves (7) and (8) for the waste gas (6) and the reactants (1) are reopened. The deposition reactor is now ready for the next deposition, which is carried out as known in the prior art.

The following examples serve to explain the invention further. The characterization of the polysilicon in respect of resistance and dopant concentration was respectively carried out according to the prior art. To this end, samples were taken from the polycrystalline silicon according to the standard SEMI MF 1723-1104 (23.10.2003) and were prepared by float zone (FZ) pulling. The resistance was determined according to standard SEMI MF 397-02 (22.10.2003) and the dopants were determined according to standard SEMI MF 1389-0704 (22.10.2003). Said standards are published by: Semiconductor Equipment and Materials International (SEMI®), San Jose, Calif. (USA).

EXAMPLE 1

Comparison of Polysilicon Batches Produced with and without Inert Gas Flushing—Resistivity of the Polysilicon Deposited on the Surface of the Thin Rod Immediately after the Start of Deposition The polycrystalline silicon was deposited as described in DE 1209113. Trichlorosilane was used as the silicon-containing component of the reaction gas. The supply and discharge lines as well as the bell jar were flushed with inert gas during the batch change, as can be seen in FIG. 4. Nitrogen was used as the inert gas; the amount of nitrogen selected was 1 m$^3$/h in the supply line, and 3 m$^3$/h in both the discharge line and the bell jar.

The minimum resistivity of the polysilicon on the surface of the thin rod immediately after the start of deposition was studied. To this end 80 batches, deposited by means of the method according to the invention with inert gas flushing, were compared with 200 batches according to the prior art (without inert gas flushing).

Figure 5:
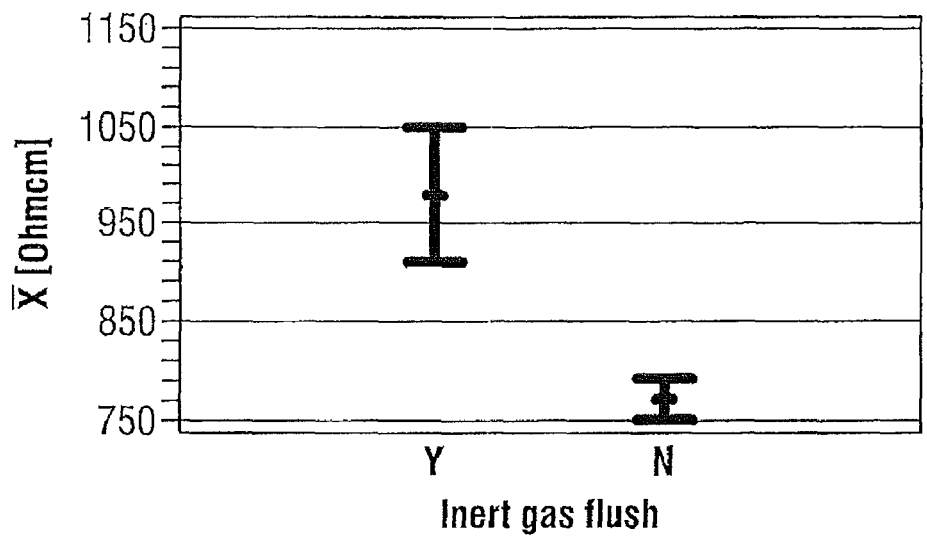
FIG. 5 illustrates the X-bar resistance values achieved with inert gas flush, immediately after the start of the deposition.

FIG. 5 shows the effect of the inert gas flushing on the electrical resistivity of the polysilicon on the surface of the thin rod immediately after the start of deposition. The average values and 95% confidence intervals of the electrical resistivity are represented. Polysilicon produced by means of the method according to the invention (inert gas flushing Y) has an average value about 30% higher for the electrical resistance on the surface of the thin rod immediately after the start of deposition than a polysilicon rod which was produced by means of a method according to the prior art (no inert gas flushing N).

EXAMPLE 2

Comparison of Polysilicon Batches Produced with and without Inert Gas Flushing—Resistance and Phosphorus Content Over the Entire Deposited Diameter The polycrystalline silicon was deposited as described in Ex. 1. The phosphorus content and the average resistivity of this polysilicon were respectively determined over the entire deposited diameter (between 100 and 150 mm). To this end 80 batches were deposited by means of the method according to the invention with inert gas flushing and compared with 200 batches according to the prior art (without inert gas flushing).

Figure 6:
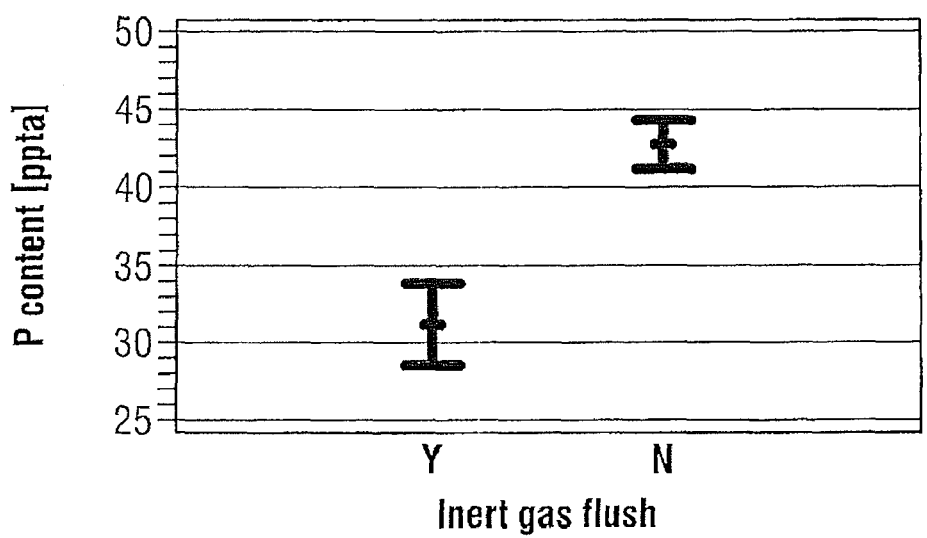
FIG. 6 illustrates phosphorus content with inert gas flush.

FIG. 6 shows the effect of the inert gas flushing on the phosphorus content of the polysilicon over the entire deposited diameter. The average values and 95% confidence intervals of the phosphorus content over the entire deposited rod diameter are represented. A polysilicon rod which was produced by means of the method according to the invention (inert gas flushing Y) shows a dopant content reduced by about 40% with respect to phosphorus, compared with a polysilicon rod which was produced by means of a method according to the prior art (no inert gas flushing N).

Figure 7:
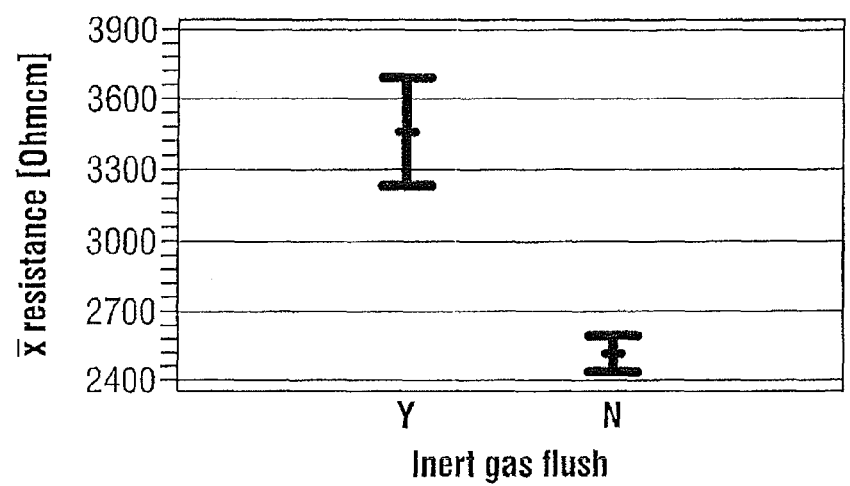
FIG. 7 illustrates the X-bar resistance values over the entire deposited rod diameter with inert gas flush.

A polysilicon rod which was produced by means of the method according to the invention (inert gas flushing) also shows a substantially higher average electrical resistivity ρ over the entire deposited rod diameter (FIG. 7), compared with a polysilicon rod which was produced by means of a method according to the prior art (no inert gas flushing N).

EXAMPLE 3

The polycrystalline silicon was deposited as described in Ex. 1. The radial profile of the electrical resistivity of the polysilicon rod was determined over the entire deposited diameter. To this end 5 batches deposited by means of the method according to the invention with inert gas flushing (batches 1-5) were compared with 5 batches deposited according to the prior art (without inert gas flushing) (batches 1C to 5C). Except for the inert gas flushing, i.e. yes or no, the parameters of the deposition were the same for all 10 batches. Table 1 shows the measured values.

TABLE 1

Radial resistance profiles with inert gas flushing during the batch change

| | Batch | | | | |
|---|---|---|---|---|---|
| | 1 | 2 | 3 | 4 | 5 |
| $\rho_\infty$ [Ωcm] | 5342 | 6199 | 4525 | 4492 | 5981 |
| $r(\rho_\infty)$ [mm] | 50.0 | 27.9 | 44.7 | 39.1 | 47.5 |
| $\rho_0$ [Ωcm] | 1222 | 1268 | 1137 | 1132 | 915 |
| $r(\rho_0)$ [mm] | 0 | 0 | 0 | 0 | 0 |
| $m_\rho$ [Ωcm/mm] | 82.4 | 176.6 | 75.8 | 85.9 | 106.7 |

Radial resistance profiles without inert gas flushing during the batch change

| | Batch | | | | |
|---|---|---|---|---|---|
| | 1C | 2C | 3C | 4C | 5C |
| $\rho_\infty$ [Ωcm] | 4091 | 3850 | 3019 | 3110 | 3348 |
| $r(\rho_\infty)$ [mm] | 47.5 | 49.0 | 37.7 | 44.7 | 39.10 |
| $\rho_0$ [Ωcm] | 921 | 594 | 729 | 609 | 863 |
| $r(\rho_0)$ [mm] | 0 | 0 | 0 | 0 | 0 |
| $m_\rho$ [Ωcm/mm] | 66.7 | 66.4 | 60.7 | 56.0 | 63.6 |

Polysilicon rods produced by means of the method according to the invention have a steeper profile of the radial electrical resistivity than polysilicon rods produced according to the prior art. The resistance plateau at the rod edge is reached faster with the method according to the invention, starting from the minimum resistance of the polysilicon on the surface of the thin rod immediately after the start of deposition. The gradient $m_\rho$ is between 75 and 180 Ωcm/mm. For batches without inert gas flushing, the gradient $m_\rho$ is between 50 and 70 Ωcm/mm.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. It is noted that while the term "bell jar" is typically used by those skilled in the art to refer to the deposition reactor, the reactors may be of varied geometries, and the terms "bell jar" and "reactor" include all such geometries.

What is claimed is:

1. In a method for the batch production of high purity polycrystalline silicon, in which a U-shaped carrier body made of silicon is fastened in an open deposition reactor, the deposition reactor is hermetically sealed, the U-shaped carrier body is heated by direct flow of current, a silicon-containing reaction gas and hydrogen are introduced into the deposition reactor through one or more supply line(s) so that silicon from the reaction gas is deposited on the carrier body, the diameter of the carrier body increases to form an enlarged carrier body and a waste gas formed is removed from the deposition reactor through one or more discharge line(s), and, after a desired diameter of the enlarged carrier body is reached, the deposition is terminated, the enlarged carrier body is cooled to room temperature, the hermetic seal is broken and the deposition reactor is opened to give an open deposition reactor, the enlarged carrier body is removed from the open deposition reactor and a second U-shaped carrier body made of silicon is fastened in the open deposition reactor, the improvement comprising feeding an inert gas through the supply line(s) and the discharge line(s) into the open deposition reactor from at least the time when the deposition reactor is opened in order to extract the enlarged carrier body until at least the time when the reactor is closed in order to deposit silicon on the second U-shaped carrier body.

2. The method of claim 1, wherein the inert gas is furthermore supplied into the open deposition reactor which has been raised in order to extract the enlarged carrier body, the inert gas being fed into the open reactor from other than the supply and discharge lines.

3. The method of claim 2, wherein the inert gas is supplied into the open reactor through an upwardly directed nozzle with a flow rate of at least 0.5 m³/h, preferably from 3 m³/h to 10 m³/h.

4. The method of claim 2, wherein the inert gas is supplied into the reactor through an upwardly directed nozzle with a flow rate of about 3 m³/h to about 10 m³/h.

5. The method of claim 1, wherein nitrogen, a noble gas, or a mixture thereof is used as the inert gas.

6. The method of claim 5, wherein nitrogen, argon, or a mixture thereof is used as the inert gas.

7. The method of claim 1, wherein the inert gas is supplied via the supply line and the discharge line in which a heat exchanger or a saturator are optionally interposed through supply and discharge openings of a base plate, the flow rate of the inert gas through the supply line is at least about 0.5 m³/h, and the flow rate of the inert gas through the discharge line is at least about 1 m³/h.

8. The method of claim 1, wherein the inert gas is supplied via the supply line and the discharge line in which a heat exchanger or a saturator are optionally interposed, through supply and discharge openings of a base plate, and the flow rate of the inert gas through the supply line is from 1 m³/h to 10 m³/h and the flow rate of the inert gas through the discharge line is from 3 m³/h to 10 m³/h.

* * * * *